United States Patent Office 3,050,151
Patented Aug. 21, 1962

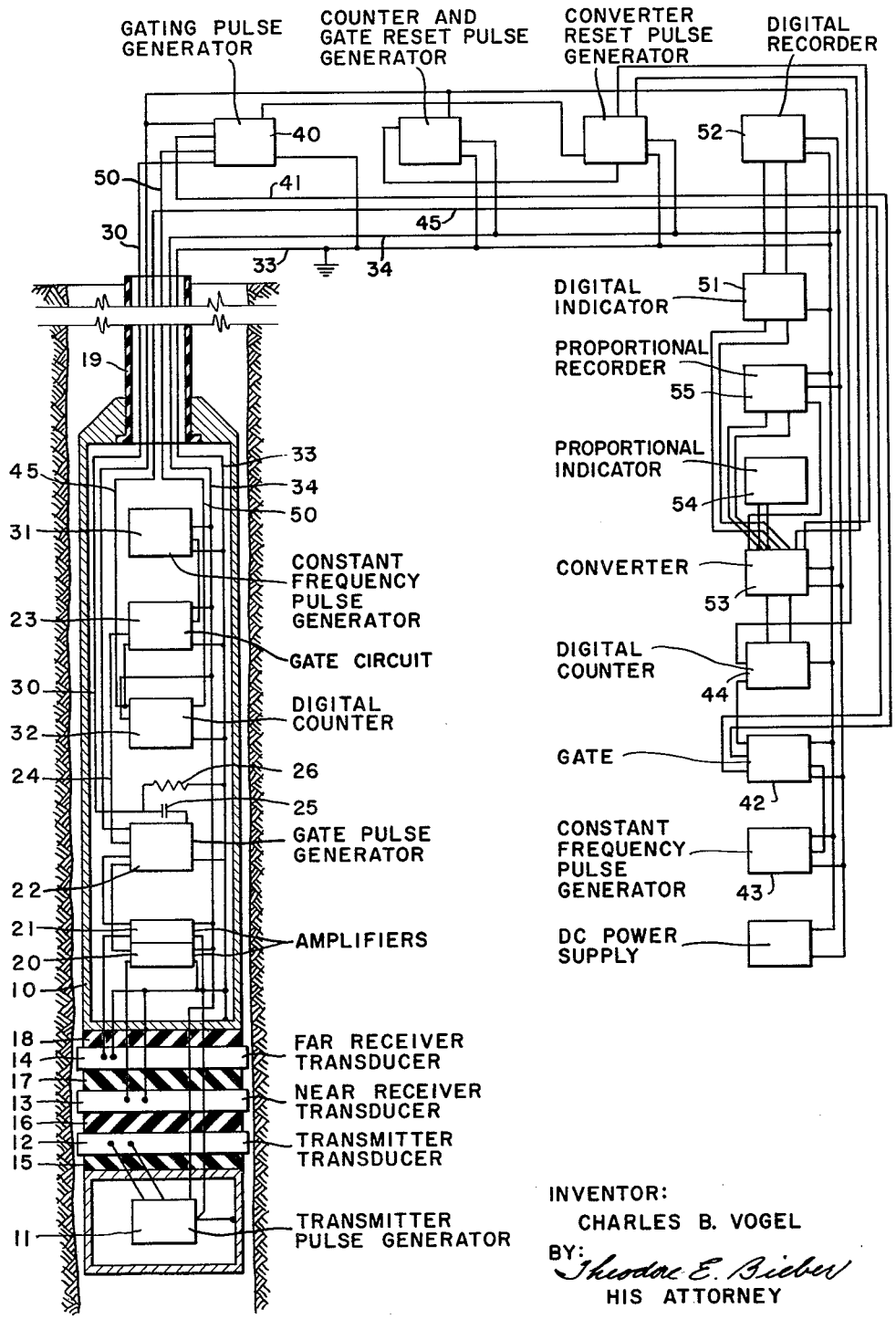

3,050,151
ACOUSTICAL WELL LOGGING
Charles B. Vogel, Houston, Tex., assignor to Shell Oil Company, a corporation of Delaware
Filed Aug. 26, 1959, Ser. No. 836,187
7 Claims. (Cl. 181—.5)

This invention pertains to well logging and more particularly to acoustical well logging over relatively short intervals along a borehole.

In one type of acoustical well logging a device is lowered into a borehole which contains at least one transmitter of discrete impulses of sound waves and at least one receiver of the sound waves. Located at the surface are various indicating and recording means for displaying the information obtained about the properties of the earth formations penetrated by the borehole. In the usual practice these recording systems record a property which is measured by indicating or recording the time required for the sound to travel either from a transmitter to a receiver or between two receivers located within a borehole. The recording may be carried out in many ways, one being described in my former Patent 2,651,027 and another being the use of recording voltmeters which indicate the magnitude of a monotonically increasing voltage wave which indicates the time required for the sound to travel between the transmitter and a receiver or between two receivers.

As disclosed in my former patent a cathode ray oscilloscope may be used for recording the time interval by utilizing the signals which indicate the arrival of the sound wave at one receiver to deflect a beam of cathode rays which are acted upon also by the sweep circuit which produces a monotonically increasing voltage wave. The pattern displayed on the oscilloscope may either be photographed or recorded by other means. An analysis of the results obtained by using either of the above-described methods indicates that they lack the accuracy required in some applications. Also, they are not adaptable to the very accurate recording of relatively short time intervals which occur when the receivers are separated by a very short distance, for example, one-half foot. This inability to record short time intervals very accurately results from the fact that all well logging cables have a large attenuation and in addition are incapable of transmitting the electrical signals indicating the arrival of the acoustical wave at two separate receivers when the two receivers are very closely spaced.

Accordingly, the principal object of this invention is to provide a recording system which is capable of recording relatively short time intervals produced by an acoustical logging device when the receivers are closely spaced.

A further object of this invention is to provide a method for transmitting logging information at a slow rate over a well logging cable even when the corresponding information signals generated in the borehole device are produced at a fast rate.

A still further object of this invention is to provide a digital recording system for measuring and recording the time intervals between signals produced by two closely spaced receivers in an acoustical logging instrument.

A still further object of this invention is to provide a digital recording system in the downhole instrument which records the actual time interval required for the acoustical pulse to travel between two closely spaced receivers and a surface digital recording system which then measures the time interval recorded by the downhole instrument by means of slowly transmitted pulses.

The above objects and advantages of this invention are obtained by providing a digital recording system in the downhole instrument of an acoustical logging device. The downhole digital system measures the actual time interval required for the acoustical pulse generated by the transmitter to travel between two closely spaced receivers. The term "two closely spaced receivers" is used to describe receivers which are spaced apart on the order of one-half to three feet and spaced from the transmitter one-half to three feet as distinguished from normal spacings which are commonly on the order of five feet or more. A pulse is transmitted from the downhole digital recording system to the surface at the instant at which the downhole instrument has completed its measuring of the time interval. This pulse is used to trigger the gate circuits of a surface located digital recording instrument which then counts the number of relatively low frequency pulses required to return the downhole digital counter to its initial condition. The relatively low frequency pulses are supplied to the surface digital counter and transmitted over the logging cable to the downhole digital counter. After the downhole digital counter has accumulated sufficient counts to return to its initial condition it transmits a second pulse to the surface equipment which actuates the gating circuits to terminate counting by the surface digital counter. Thus, the count displayed by the surface digital counter is inversely proportional to the time required for the acoustical pulse to travel between two receivers. The final count accumulated on the surface digital counter can be recorded on punched tape or as a printed record and can be converted into an electrical analog which can be recorded in the form of a continuous chart record. In most logging operations it is preferred to have a continuous chart record of the information being logged for inspection during a logging operation and subsequent use. The digital recording of the information is also desirable since it provides a simple means for checking the accuracy of the chart record as well as a simple means for supplying the information to digital computing equipment for subsequent use in determining the properties of the earth formation traversed by the borehole.

The above objects and advantages will be more easily understood by those skilled in the art from the following detailed description of a preferred embodiment when taken in conjunction with the attached figure showing a schematic arrangement of this invention.

Referring now to the drawing there is shown a downhole instrument in which all of the various circuits and equipment are mounted within or on a pressure tight case 10. The pressure tight case 10 is suspended from the end of a suitable cable 19 which is preferably a six conductor cable. The cable 19 is utilized to both raise and lower the instruments in the borehole and to transmit signals and suitable power to and from the downhole instrument. A pulse generator and transmitter 11 is mounted in the lower portion of the housing 10 and connected to a transmitting transducer 12. The transmitting transducer 12 may be any well known type of transducer which transmits an acoustical pulse when supplied with a suitable electrical signal. A preferred type of transducer is a magnetostrictive type in which a tubular member formed of a magnetostrictive material such as a nickel cobalt alloy is mounted on the case 10 and a coil of wire wound axially around the tubular element. Positioned above the transmitting transducer 12 are two receiving transducers 13 and 14 also magnetostrictive type transducers. The first receiving transducer 13 which may be spaced from the transmitting transducer 12 by a distance on the order of one-half to two feet and the second transducer 14 spaced from the first by a relatively short interval on the order of one-half foot but in any case less than three feet. All of the transducers are connected to each other and the remainder of the case 10 by means of flexible connecting links 15, 16, 17 and 18, respectively. These flexible connecting links should be capable of insulating the transducers from one another to prevent the direct transmission of the acoustical impulse through the links and in addition have a relatively fixed length.

The electrical signals from the two receiving transducers 13 and 14 are coupled to two amplifiers 20 and 21, respectively. The output signals from the two amplifiers are coupled to a gating pulse generator 22. The gating pulse generator initiates both a negative and positive gating pulse upon reception of the initial portion of the output signal from the amplifier 20. More particularly, the gating pulse generator 22 should be adjusted so that a voltage wave having certain threshold level and the proper polarity will trigger it, for example the first negative going portion of the signal from the amplifier 20 exceeding a predetermined level. The generation of both the negative and positive gating signals is terminated upon the reception of the initial portion of the signal from amplifier 21. Again the gating pulse generator should be adjusted so that it terminates the gating pulse upon the reception of a signal having the proper polarity and a predetermined voltage level from the amplifier 21.

The negative gating pulse is coupled to a gate circuit 23 by means of a lead 24 while the positive gating pulse is differentiated by a series capacitor 25 and resistance 26, respectively. The differentiated gating pulse which will have the form of a positive trigger pulse or spike followed by a negative trigger pulse or spike is transmitted to the surface over a conductor 30.

The gate 23 is coupled to a constant frequency pulse generator 31 and disposed to transmit the train of pulses from the generator 31 to a digital counter 32. The gate 23 of course opens upon the commencing of the negative gating pulse and closes upon the termination of the negative gating pulse. Thus, the digital counter 32 will accumulate a final count which will indicate the number of pulses generated by the constant frequency pulse generator 31 during the time interval required for the acoustical impulse to travel from the receiver 13 through the earth formation surrounding the borehole to the receiver 14. The constant frequency generator 31 has a relatively high frequency in order to increase the accuracy of the device, a frequency on the order of ten megacycles being sufficient. All of the downhole circuits are supplied with power by means of a power lead 34 and ground lead 33.

The negative trigger pulse from the downhole differentiating circuit which is transmitted over the conductor 30 is utilized to trigger a gating pulse generator 40 located at the surface. The gating pulse generator 40 is designed so that it is triggered by a negative pulse but not by a positive pulse, thus, it will disregard the positive trigger pulse which indicates the start of the gating pulse generated by the downhole gating pulse generator 40. The negative trigger pulse of course indicates the termination of counting by the downhole digital counter 32. The gating pulse generator 40 is similar in construction to the downhole gating pulse generator 22 and generates a square wave pulse whose length is determined by the negative pulse described above and a positive pulse generated as described below by the downhole digital counter.

The square wave pulse is transmitted by means of a lead 41 to a gate circuit 42. The gate circuit 42 is designed to control the transmission of pulses from a constant frequency pulse generator 43 to a digital counter 44. More particularly, the gate 42 opens upon commencement of the negative gating pulse by the gating pulse generator 40 and closes upon the termination of the negative gating pulse. The constant frequency pulse generator 43 should have a relatively low frequency, one kilocycle being a suitable value. In addition to transmitting the pulses from the pulse generator 43 to the digital counter 44 the gate 42 also transmits them by means of a lead 45 to the downhole digital counter 32. Thus, it is seen that both the surface digital counter 44 and the downhole digital counter 32 will count the pulses from the generator 43.

The downhole digital counter 32 will continue to count the pulses from the pulse generator 43 until it reaches its initial condition or a predetermined condition. Upon accumulating the number of counts corresponding to this initial or predetermined condition the downhole digital counter will terminate its counting and transmit a positive pulse by means of a lead 50 to the gating pulse generator 40 located at the surface. Upon receipt of this positive pulse by the gating pulse generator 40 it will terminate the generation of the negative gating pulse and thus close the gate 42. This will terminate the counting of the pulses by both the digital counter 32 in the downhole instrument and the surface digital counter 44. The final count displayed by the digital counter 44 will thus be uniquely related to the time required for the acoustical pulse to travel between the two downhole receivers.

The final count on the digital counter 44 is passed through a digital indicating means 51 and recorded on a digital recording device 52. As explained above, the recording may be either in the form of a printed record or punched tape, depending upon what use is to be made of the logging information. Punched tape is usually preferred since it may be supplied directly to other computing equipment to obtain additional information from the logging data. The final count of the digital counter is also passed through a converter 53 which converts the accumulated count to an electrical analog which may be subsequently read on an indicating device 54 as well as recorded on device 55 if so desired. The recording device 55 is preferably a continuous chart recorder whose travel is synchronized with the movement of the downhole instrument through the borehole and on which the lateral trace deflection from the maximum value is made proportional to the time required for the acoustical pulse to travel between the two downholde receivers through the earth formation. Since the velocity is inversely proportional to the time required for the acoustical impulse to travel between the two downhole receivers the reading of digital counter 44 thus indicates velocity. Thus, it is a simple matter to utilize the information from the surface digital counter 44, by applying suitable correcting factors and scales to display information on the recording device 55 directly in terms of velocity.

When the above device is operated, the downhole instrument is lowered into the borehole by means of a cable 19. The travel of the cable 19 is measured to synchronize the movement of the downhole instrument with the recording means 55. This, of course, can be accomplished by the use of well known selsyn type devices or the like. As the instrument is lowered the pulse generator 11 generates a continuous train of electrical signals having suitable wave shapes and amplitude to actuate the transmitting transducer 12. The signals generated by the pulse generator 11 should be spaced in time a sufficient amount to permit the reception of each acoustical impulse at both receivers 13 and 14 and the recording of this information. Also, the pulses should be spaced close enough so that readings are obtained sufficiently close together to give a true indication of the actual velocity of the acoustical impulse through the earth formation without large gaps or missed sections in the records. The two receivers 13 and 14 receive the acoustical impulses and convert them to electrical signals which are used to control the operation of the gate circuits and downhole digital counter. This results in the accumulation of a count on the downhole digital counter which indicates the time required for the impulse to travel between the two receivers. As explained above if a relatively high pulse rate is used for the downhole digital counter it will accurately measure this time interval. Since all the amplifying and gating circuits as well as the digital counters are located in the downhole instrument no problem of attenuation of signals or crosscoupling of the signals in the various conductors is encountered. Thus, it is not necessary to use amplifiers which switch off one receiver or the other as are used in prior acoustical logging devices.

The termination of the counting by the downhole digital counter 32 is used to trigger the surface located gating circuits and digital counter so that they may count the number of pulses from a low frequency pulse source required to return the downhole digital counter 32 to its initial or a predetermined condition. If the circuits of the downhole digital counter 32 are properly chosen with relation to the time intervals to be recorded only a short time will be required for the necessary number of pulses to be transmitted over the conductor 45 to the downhole digital counter. For example, in normal logging operations using a one-half foot spacing between the receivers the usual time intervals encountered vary between 20 and 80 microseconds. Assuming that the frequency of the pulse source 31 is 10 megacycles the downhole digital counter will accumulate or record counts in the range of 200 to 800. Thus, if the downhole count is to be returned to an initial count of 1000 only a maximum of 800 pulses will be required to be transmitted over the conductor 45. Assuming that the surface located pulse source 43 has a frequency of 1 kilocycle per second this means that only .8 second will be required to return the downhole digital counter to its initial condition. The final count recorded by the surface digital counter 44 will indicate a quantity which is uniquely related to the time interval and thus it may be used directly for determining the velocity of the earth formation. This can be seen if one considers the number of pulses fed into the downhole digital counter 32 during the time interval being measured as $n$, the number corresponding to the initial condition of the counter as $N$, and the number of pulses counted by the surface digital counter in returning the downhole digital counter to $N$ as $n_1$; thus $n_1 = N - n$. It can be recorded both as a digital quantity and as a proportional quantity after it is converted to an electrical analog.

From the above description it can be appreciated that this invention has provided a means for accurately measuring short time intervals determined by an acoustical logging device having closely spaced receivers. These results are obtained without the accompanying difficulty of transmitting two closely spaced electrical signals over a logging cable. As explained above, logging cables, especially long cables or older logging cables, tend to seriously attenuate signals and in addition signals tend to crosscouple between the various conductors or intermingle between themselves if transmitted over a single conductor. Signals will intermingle even if one receiver is switched off as has been suggested in the prior art since the signals of closely spaced receivers occur so close together it is impossible to completely remove the effect of the first signal from the cable prior to the transmission of the second. Also, due to the attenuation of the cable the signals will tend to intermix before they are received at the surface. The transmission of the relatively low frequency signals from the pulse source 43 over the logging cable is a simple matter inasmuch as these impulses have a relatively sharp wave shape and are separated by a considerable time interval.

While this invention has been described in detail in relation to an acoustical logging system employing a pair of receivers it can be expanded to include additional receivers by increasing the number of subsurface and surface digital counting systems. Moreover the method and system may be employed to record any property of the earth which involves the production of signals at a faster rate than that at which they can be transmitted over a logging cable. The method automatically interrogates the subsurface apparatus after the completion of every measurement cycle and erases the information stored on subsurface equipment after interrogating it.

In addition to the above method of operating the method may also be used to measure the number of electrically detected events which occur in a selected time interval. In this type of measurement the subsurface equipment counts the number of events that occur during the time interval and supplies a signal to the surface equipment at the end of the time interval. The surface equipment would then interrogate the subsurface apparatus in the same manner as described above and erase the information stored thereon. From the information recorded on the surface equipment one can easily determine the information recorded on the subsurface equipment.

I claim as my invention:

1. An acoustical logging system comprising: a downhole instrument including a transducer capable of transmitting an acoustical impulse and two closely spaced receiving transducers for receiving said impulse, said receiving transducers disposed to receive the impulse and convert it to electrical signals; said receiving transducers being coupled to a gating means located in the downhole instrument, said gate means being opened by one receiver signal and closed by the other receiver signal, said gate means being coupled to a first digital counter, a first source of high frequency pulses located in the downhole instrument, said gate means being disposed to control the application of pulses from said first source of relatively high frequency pulses to said first digital counter; a second digital counter and second gate means located at the surface, a second source of relatively low frequency pulses coupled to said second digital counter and said first digital counter by said second gate means, said second gate means being disposed to open when said first gate means closes, said first digital counter being disposed to generate a signal to close said second gate means when said first digital counter has been returned to its initial condition by the pulses from said second source and means coupled to said second digital counter for recording the total count recorded on said second digital counter.

2. An acoustical logging system comprising: a downhole instrument including means for generating an acoustical impulse and two closely spaced means disposed to one side of said generating means for receiving said impulse and converting it into two electrical signals; a digital counter and gate means located in said borehole, said two closely spaced receiving means being coupled to said gate means whereby said electrical signals may open and close said gate means, said gate means being disposed to couple a source of high frequency pulses to said digital counter; a second digital counter and gate means located at the surface, circuit means coupling said downhole digital counter and gate means to said second digital counter and gate means, a source of low frequency pulses, said second gate means being disposed to couple said low frequency pulses to both said first and second digital counters; said second gate means being disposed to open in response to the closing of the downhole gate means, said first digital counter generating a signal indicating the accumulation on said first digital counter of a predetermined count, said second gate means closing in response to the signal generated by the first digital counter and recording means coupled to said second digital counter for recording the count of said digital counter.

3. A recording system for measuring and recording a time interval detected by a downhole instrument and indicated by electrical pulses at its beginning and end comprising: a downhole instrument having a first digital counter, a source of high frequency pulses and a first gate means disposed to couple said source of high frequency pulses to said first digital counter, said first gate means being disposed to open in response to an electrical pulse indicating the beginning of the time interval and close in response to an electrical pulse indicating the end of the time interval; a surface recording instrument including a second digital counter, a source of low frequency pulses and a second gate means, circuit means for coupling the surface recording instrument to the downhole instrument, said second gate means disposed to couple said source of low frequency pulses to both said first and second digital counters; said second gate means being disposed to open in response to the closing of said first gate means, said first digital counter generating a signal indicating the accumulation of a predetermined count, said second gate means being disposed to close upon the occurrence of said signal and a readout and recording system coupled to said second digital counter for recording the total count of said second digital counter.

4. An acoustical logging device comprising: a downhole instrument disposed to be lowered into a borehole on a cable, said cable providing circuit means for coupling said downhole instrument to a surface recording system; said downhole instrument including a source of acoustical impulses and two receivers disposed on one side of and spaced from said source from each other a distance of less than three feet; said receivers being disposed to receive said acoustical impulse and convert it to electrical signals, said receivers being coupled to a gate circuit, said gate circuit being actuated by said electrical signals to control the application of pulses from a high frequency source to a first digital counter, both said pulse source and digital counter being located in the downhole instrument; a surface recording system including a second digital counter and gate circuit, the second gate circuit being coupled to said first digital counter and disposed to open upon the closing of the first gate circuit to apply pulses from a low frequency source to both said first and second digital counters, said second gate circuit being adapted to close when said first digital counter accumulates a predetermined total count and a readout and recording system coupled to said second digital counter for recording the total count thereof.

5. An acoustical logging device comprising: a downhole instrument disposed to be lowered into a borehole on a cable, said cable providing circuit means for coupling said downhole instrument to a surface recording system; said downhole instrument including a source of acoustical impulses and two receivers disposed on one side of and spaced from said source, said receivers in addition being spaced from each other a distance of less than three feet; said receivers being disposed to receive an acoustical impulse from said source and convert it to electrical signals, the time interval indicated by the time separation of said electrical signals being recorded in the downhole instrument; interrogating means associated with a surface recording system for interrogating said downhole instrument over said cable to determine the magnitude of said time interval, said interrogating means operating within the signal transmitting capacity of the cable.

6. An acoustical logging device comprising: a downhole instrument disposed to be lowered into a borehole on a cable, said cable providing circuit means for coupling said downhole instrument to a surface recording system; said downhole instrument including a source of acoustical impulses and two receivers disposed on one side of and spaced from said source, said receivers in addition being spaced from each other a distance of less than three feet; said receivers being disposed to receive an acoustical impulse from said source and convert it to electrical signals, digital means in the downhole instrument coupled to said receivers, said digital means being disposed to utilize a high frequency pulse for recording the time interval indicated by the time separation of said electrical signals; a digital counter located in a surface recording system and coupled to said digital means, said digital counter being disposed to utilize a low frequency source for interrogating said downhole digital means over said cable to determine the magnitude of the recorded time interval.

7. A system for transmitting information over an electrical transmission line from a remote to a convenient location where the information is represented by a number of periodic electrical pulses comprising: a remotely located first counting means for counting the number of electrical pulses at remote location which represent the information to be transmitted and storing the total count at the remote location; a source of electrical pulses coupled to said first counting means for transmitting low frequency electrical pulses from the convenient to the remote location; second counting means at a convenient location for counting said low frequency pulses at said convenient location; signal generating means connected in the system for generating and transmitting a signal from the remote to the covenient location when the total of the low frequency pulses plus the stored count accumulated on the first counting means equals a predetermined total; a signal-actuated switch means disposed at said convenient location for utilizing said signal to terminate the transmission of low frequency pulses; and recording means for recording the low frequency pulses counted at the convenient location, to indicate the number of electrical pulses counted at the remote location.

References Cited in the file of this patent
UNITED STATES PATENTS

| | | |
|---|---|---|
| 2,566,078 | Bliss | Aug. 28, 1951 |
| 2,708,485 | Vogel | May 17, 1955 |
| 2,907,021 | Woods | Sept. 29, 1959 |
| 2,938,592 | Charske et al. | May 31, 1960 |
| 2,949,973 | Broding et al. | Aug. 23, 1960 |

FOREIGN PATENTS

| | | |
|---|---|---|
| 619,964 | Canada | May 9, 1961 |